(12) United States Patent
Hageman et al.

(10) Patent No.: US 6,585,211 B1
(45) Date of Patent: *Jul. 1, 2003

(54) WHEEL CHOCKING DEVICE AND METHOD FOR USING THE SAME

(75) Inventors: Martin P. Hageman, Mequon, WI (US); Thomas J. Palus, Cedarburg, WI (US); Charles H. Hodges, Ruxton, MD (US); Jack L. Sherard, Whitefish Bay, WI (US)

(73) Assignee: Kelley Company, Inc., Mequon, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/214,407

(22) PCT Filed: Jun. 27, 1997

(86) PCT No.: PCT/US97/11411

§ 371 (c)(1),
(2), (4) Date: Jun. 17, 1999

(87) PCT Pub. No.: WO97/49627

PCT Pub. Date: Dec. 31, 1997

Related U.S. Application Data

(60) Provisional application No. 60/020,686, filed on Jun. 27, 1996.

(51) Int. Cl.⁷ ............................................. A47B 91/00
(52) U.S. Cl. ..................... 248/346.01; 414/401; 188/32
(58) Field of Search ........................... 248/352, 346.01; 414/396, 401, 584; 410/30; 188/32

(56) References Cited

U.S. PATENT DOCUMENTS

| 1,102,773 A |   | 7/1914  | Martin  |         |
|-------------|---|---------|---------|---------|
| 2,666,502 A | * | 1/1954  | Fee     | 188/32  |
| 2,858,905 A |   | 11/1958 | Fahland |         |
| 2,895,569 A | * | 7/1959  | Nystrom | 410/30  |
| 3,110,466 A |   | 11/1963 | O'Sullivan | 248/119 |

(List continued on next page.)

FOREIGN PATENT DOCUMENTS

| DE | 583404    | 2/1933 |            |
|----|-----------|--------|------------|
| EP | 537074 A1 | 4/1993 | B65G/67/02 |
| FR | 91 12448  | 4/1963 | B60T/3/00  |
| IT | 526008    | 2/1958 |            |
| WO | WO95/18029 | 7/1995 | B60T/1/14  |

OTHER PUBLICATIONS

"Equipements Servoquai" brochure published by Michel Roux starting in Mar., 1991 or earlier, and translation.
"Les Hommes, Les Vehicules, Le Quai" brochure published by Michel Roux starting in Nov., 1991 or earlierr, and translation.

(List continued on next page.)

Primary Examiner—Anita King
Assistant Examiner—Gwendolyn Baxter
(74) Attorney, Agent, or Firm—Baker & Hostetler LLP

(57) ABSTRACT

A wheel chocking device (13) having a wheel chock (34) that can be raised from a retracted position to a raised position. In the retracted position, the wheel chock (34) is substantially flat, thereby allowing a truck (36) to be driven over the wheel chock (34). In the raised position, the wheel chock (34) can be engaged with the wheel (36) of a truck to prevent the truck from driving away from a loading dock. In one embodiment, movement of the chock (34) is provided by pneumatic cylinders (120) that drive cables (124) or chains associated with pneumatic pistons (122) positioned within the cylinders (120). As the chock (34) is moved from the distal position, the chock (34) can raise from a lowered position to an intermediate position (3). The chock (34) is then moved toward the vehicle wheel (36). Upon contact with the wheel (36), the chock (34) will raise from the intermediate position to the fully raised position. In another embodiment, the chock (136) can be inserted laterally from the side of the wheel (36).

4 Claims, 15 Drawing Sheets

U.S. PATENT DOCUMENTS

| | | | | |
|---|---|---|---|---|
| 3,305,049 A | | 2/1967 | Willey | 188/32 |
| 3,734,241 A | * | 5/1973 | Hale | 188/32 |
| 3,845,845 A | | 11/1974 | Geisthoff | 188/32 |
| 4,207,019 A | | 6/1980 | Cone | 414/373 |
| 4,216,724 A | | 8/1980 | Grillet | 104/258 |
| 4,674,929 A | | 6/1987 | Blunden | 410/30 |
| 4,674,941 A | * | 6/1987 | Hageman | 414/401 |
| 4,969,792 A | | 11/1990 | Ellis et al. | 410/401 |
| 5,249,905 A | | 10/1993 | Warner et al. | 414/401 |
| 5,302,063 A | | 4/1994 | Winsor | 410/30 |
| 5,375,965 A | * | 12/1994 | Springer et al. | 414/786 |
| 5,553,987 A | | 9/1996 | Ellis | 414/401 |
| 5,582,498 A | | 12/1996 | Springer et al. | 414/401 |
| 5,664,930 A | * | 9/1997 | Ellis | 414/401 |
| 5,709,518 A | | 1/1998 | Alexander et al. | 414/401 |
| 5,762,459 A | | 6/1998 | Springer et al. | 414/401 |
| 5,927,928 A | * | 7/1999 | Hageman et al. | 414/401 |
| 5,934,857 A | | 8/1999 | Alexander | 414/401 |
| 6,250,432 B1 | | 6/2001 | Hageman et al. | 188/32 |
| 6,276,496 B1 | * | 8/2001 | Hageman et al. | 188/32 |

OTHER PUBLICATIONS

Photographs published by Michel Roux in 1991.

"Descriptif Technique, Descriptif de Fonctionnement, & Caractristiques Techniques" brochure published by Michel Roux starting in Oct., 1991 or earlierr, and translation.

"Amenagement de Quais Industriels" brochure by Michel Roux starting in Nov., 1991 or earlierr, and translation.

"Calage Automatiqe" brochure published collectively with the "Amenagement de Quais Industriels" brochure by Michel Roux starting in Mar., 1992 or earlier, and translation.

* cited by examiner

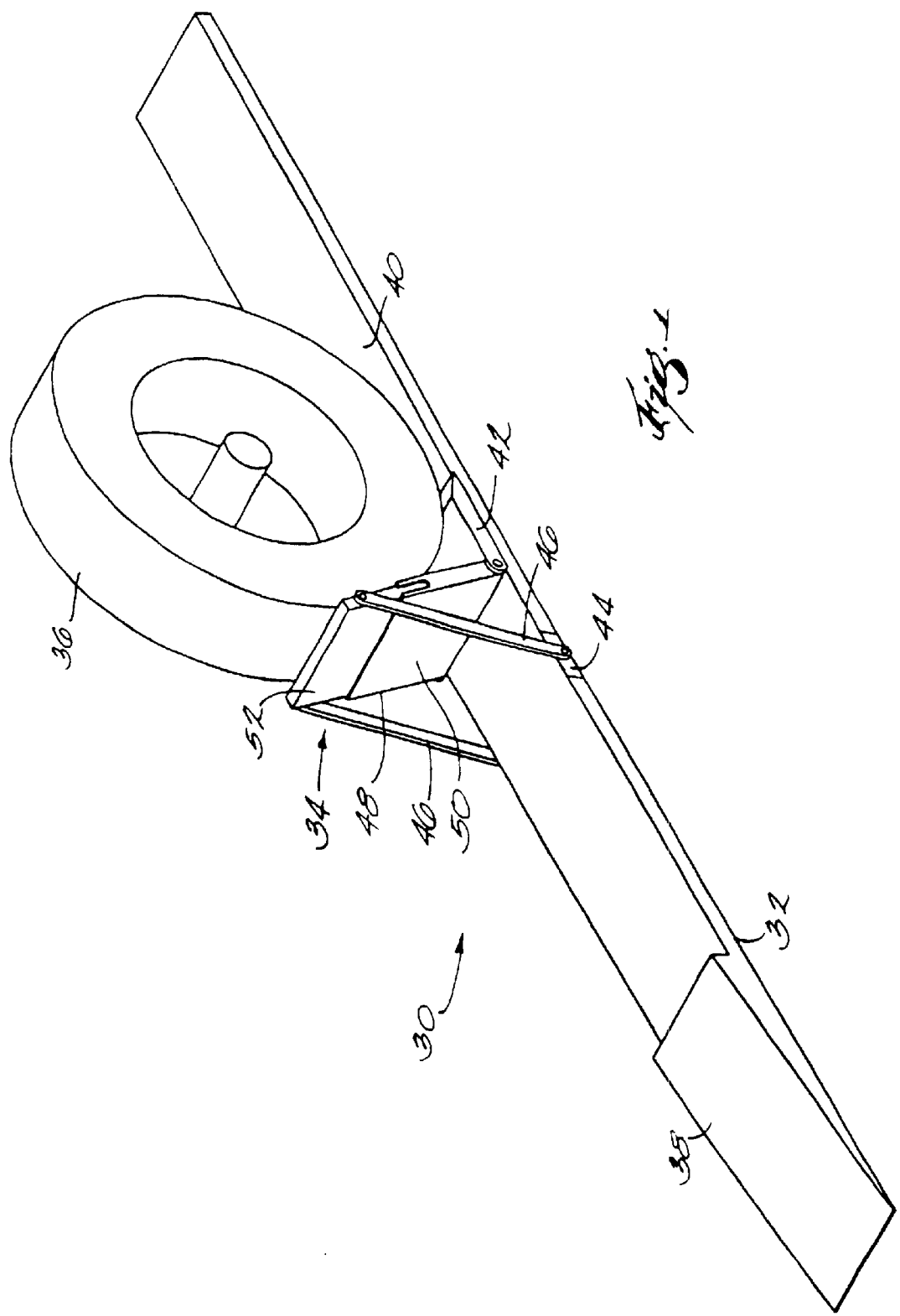

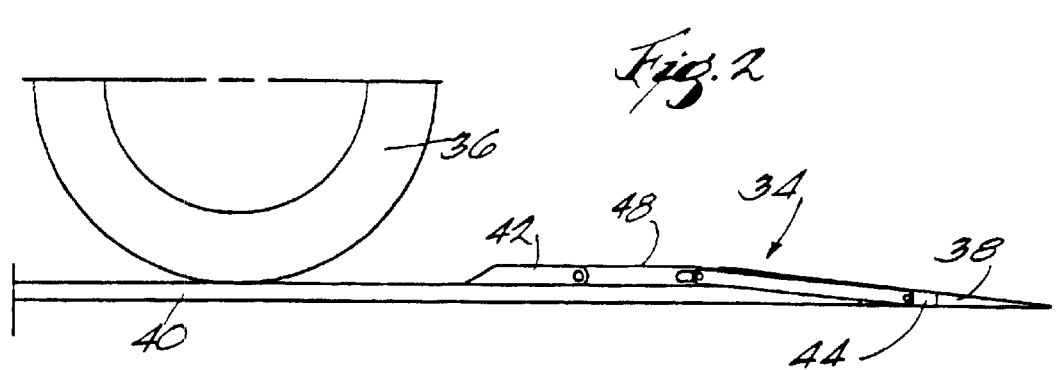
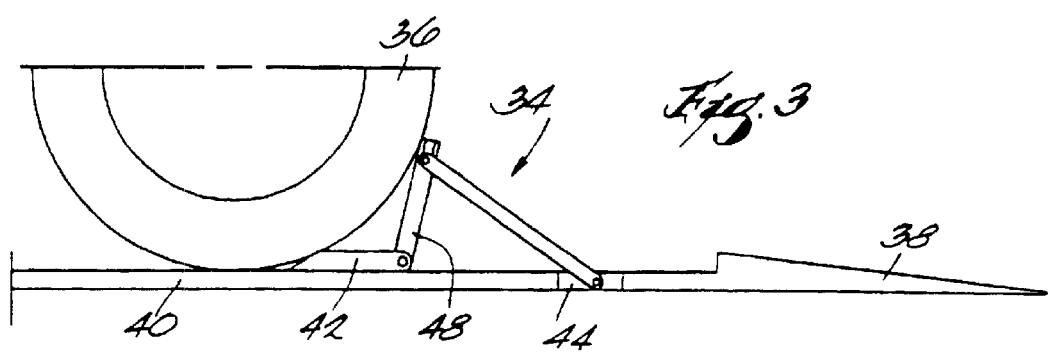
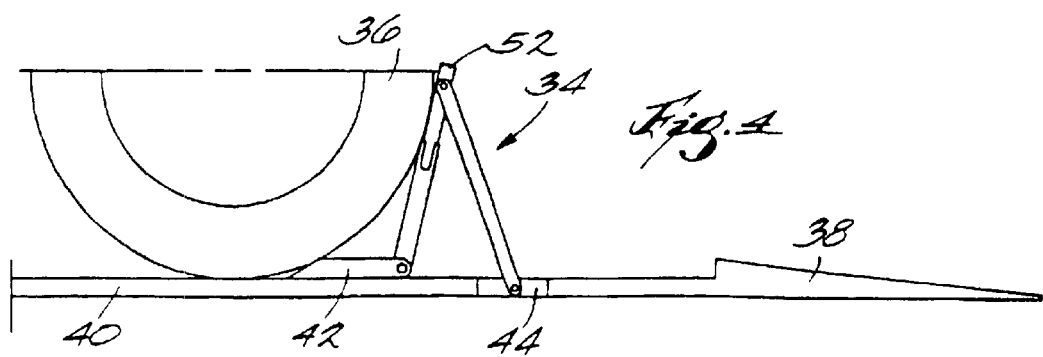

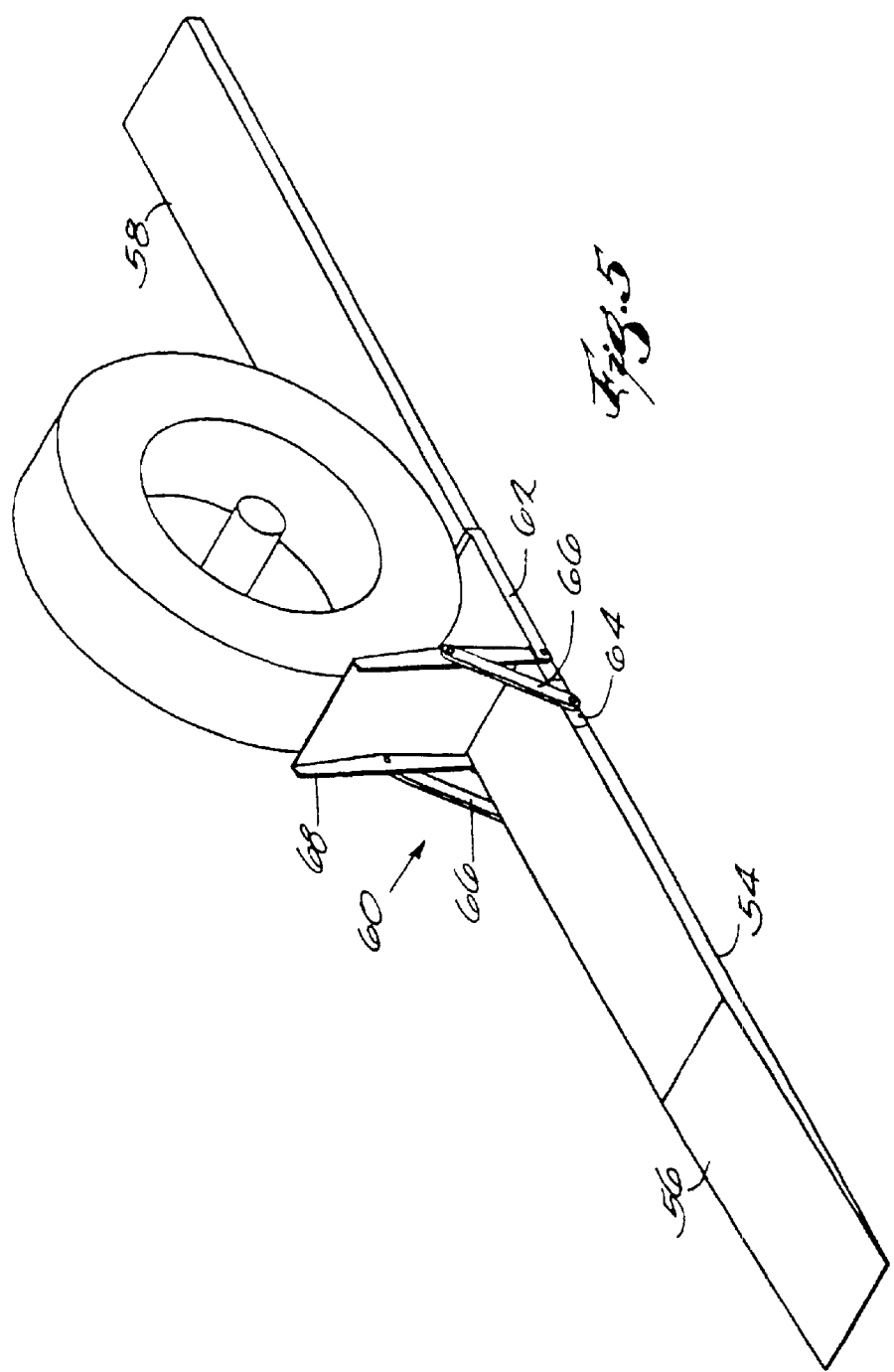

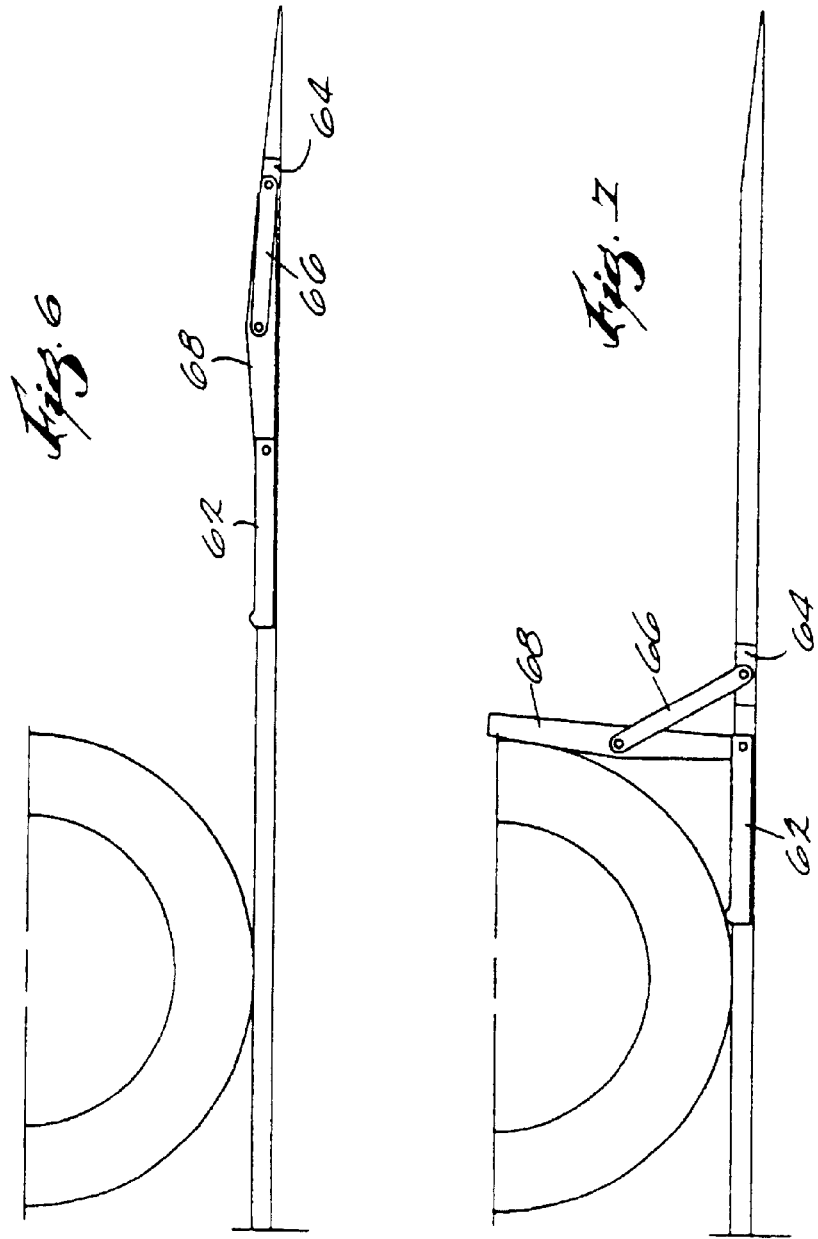

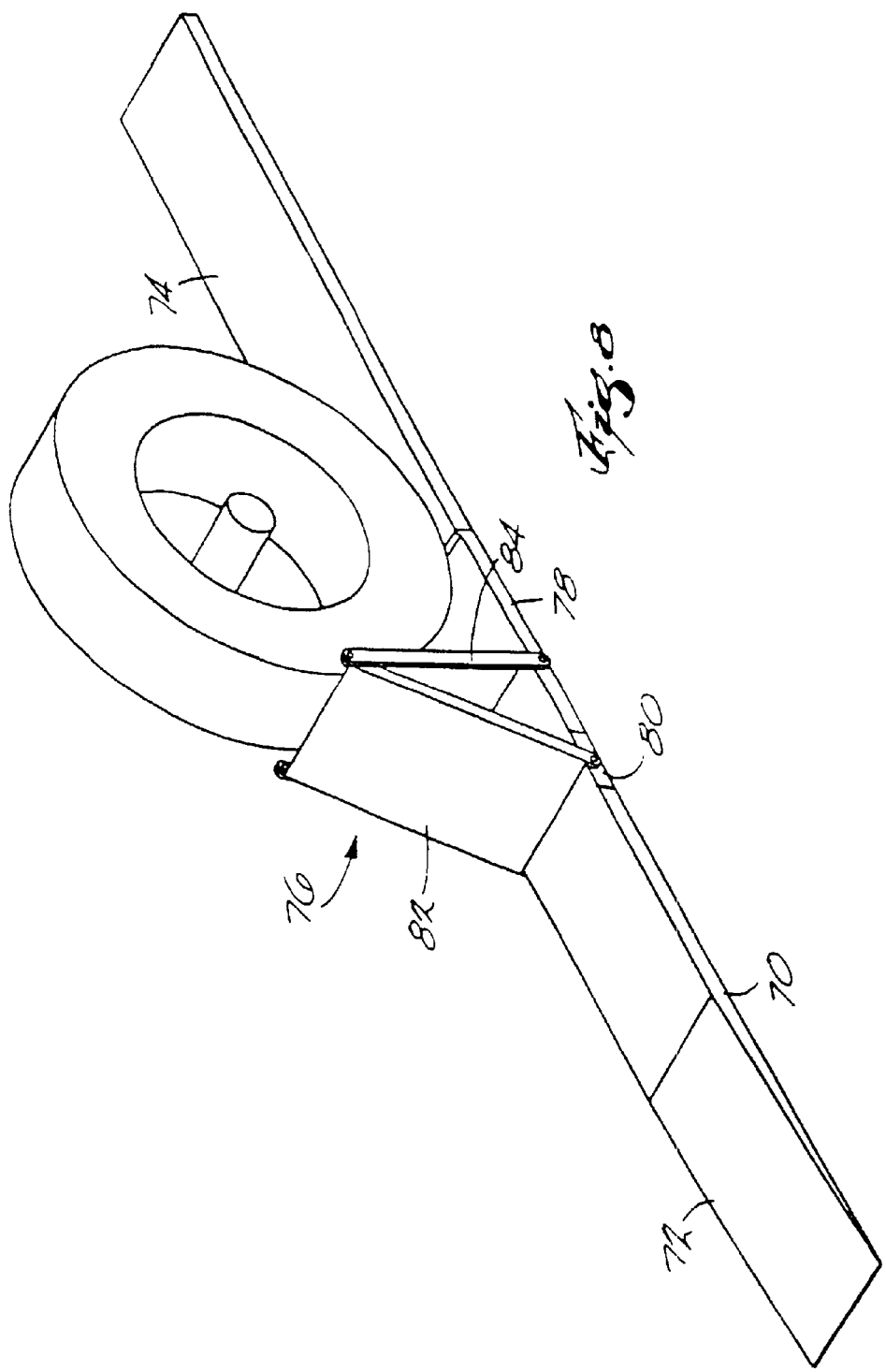

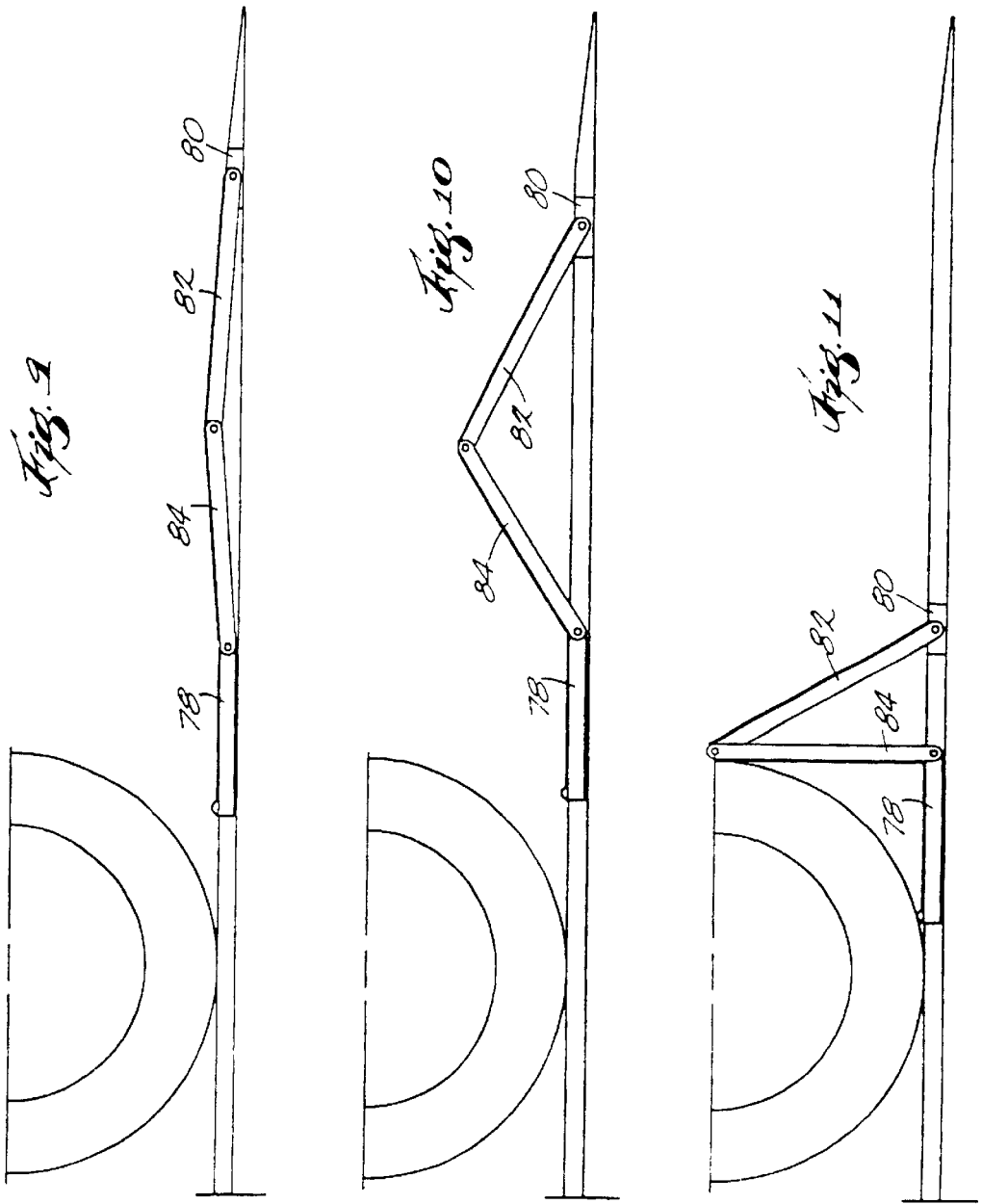

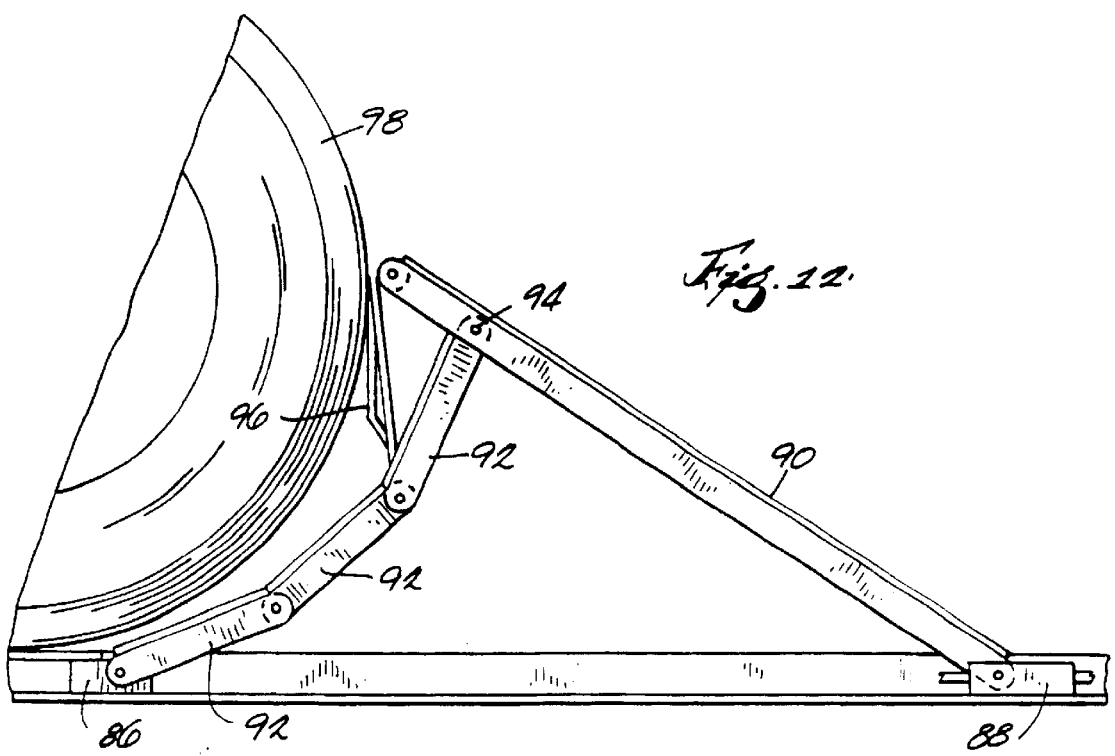
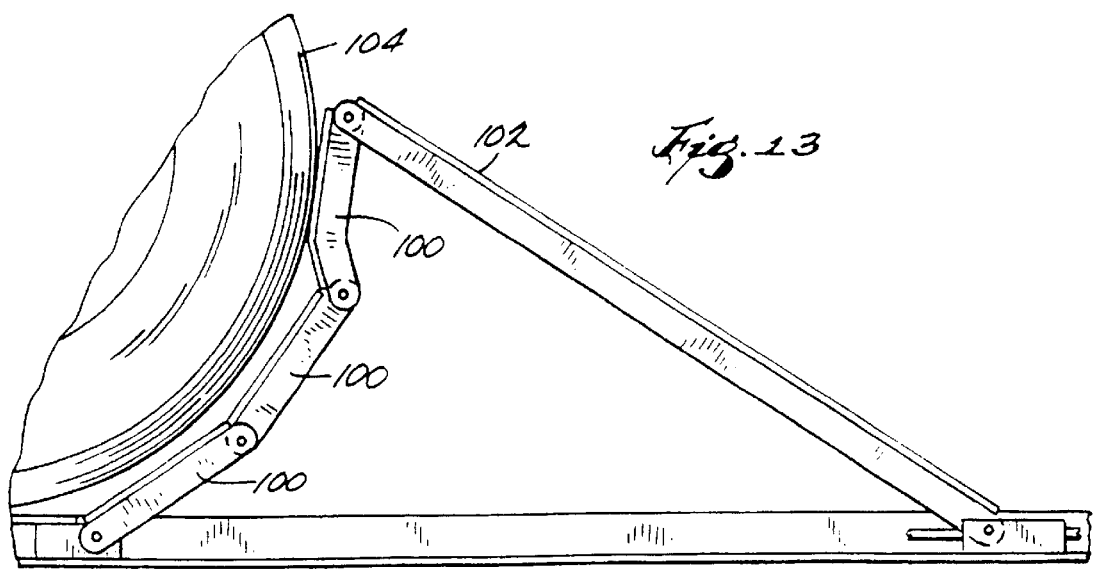

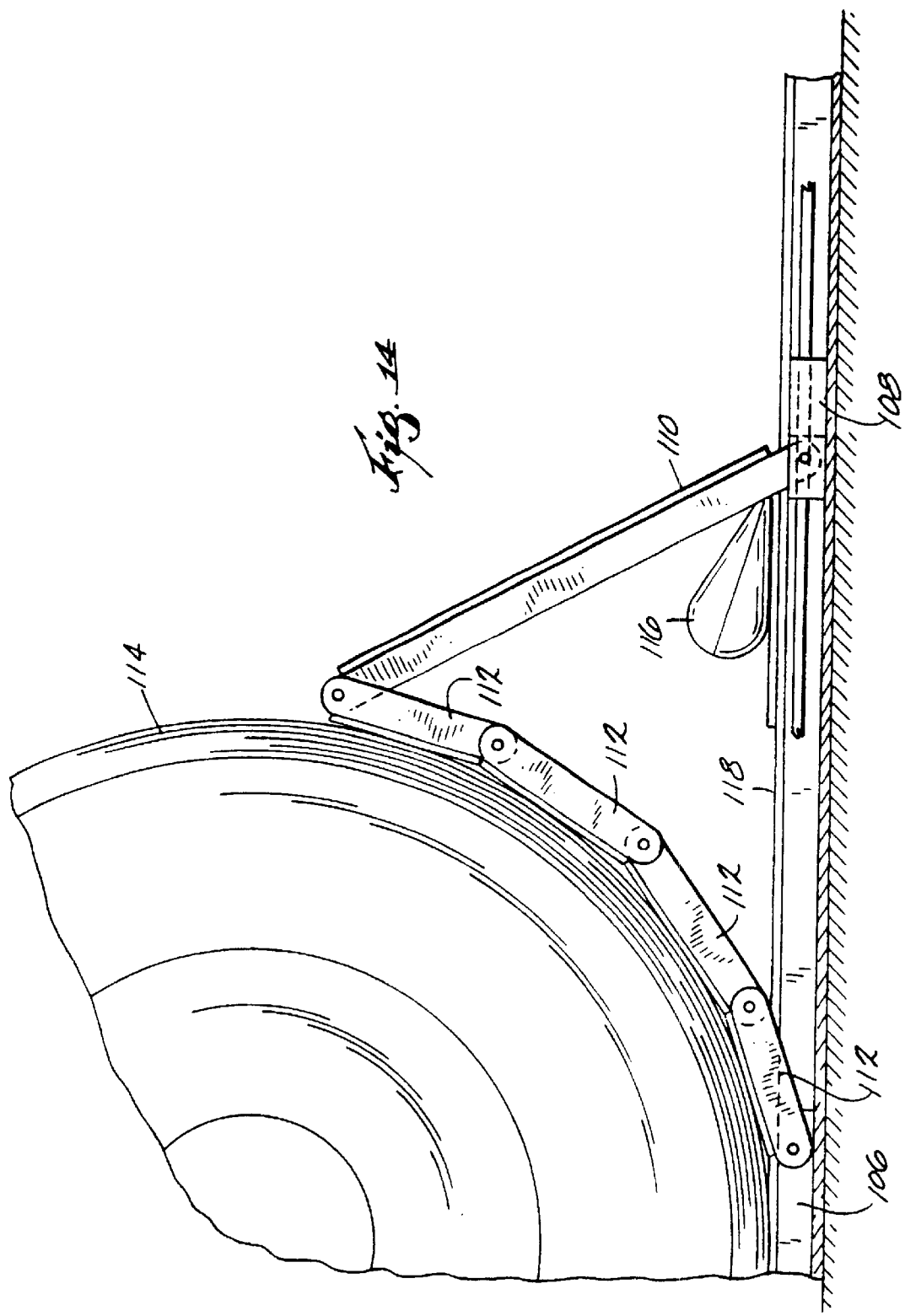

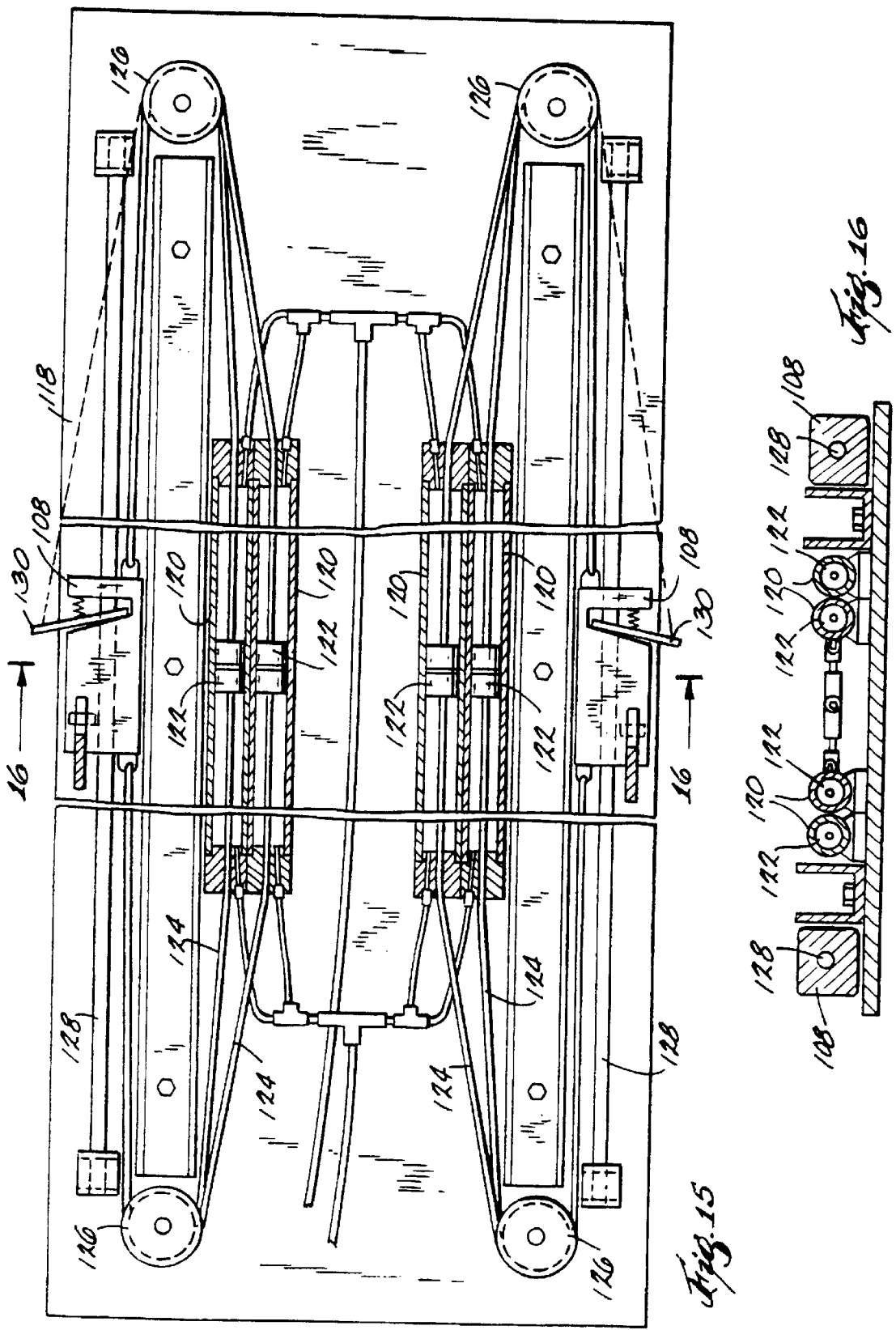

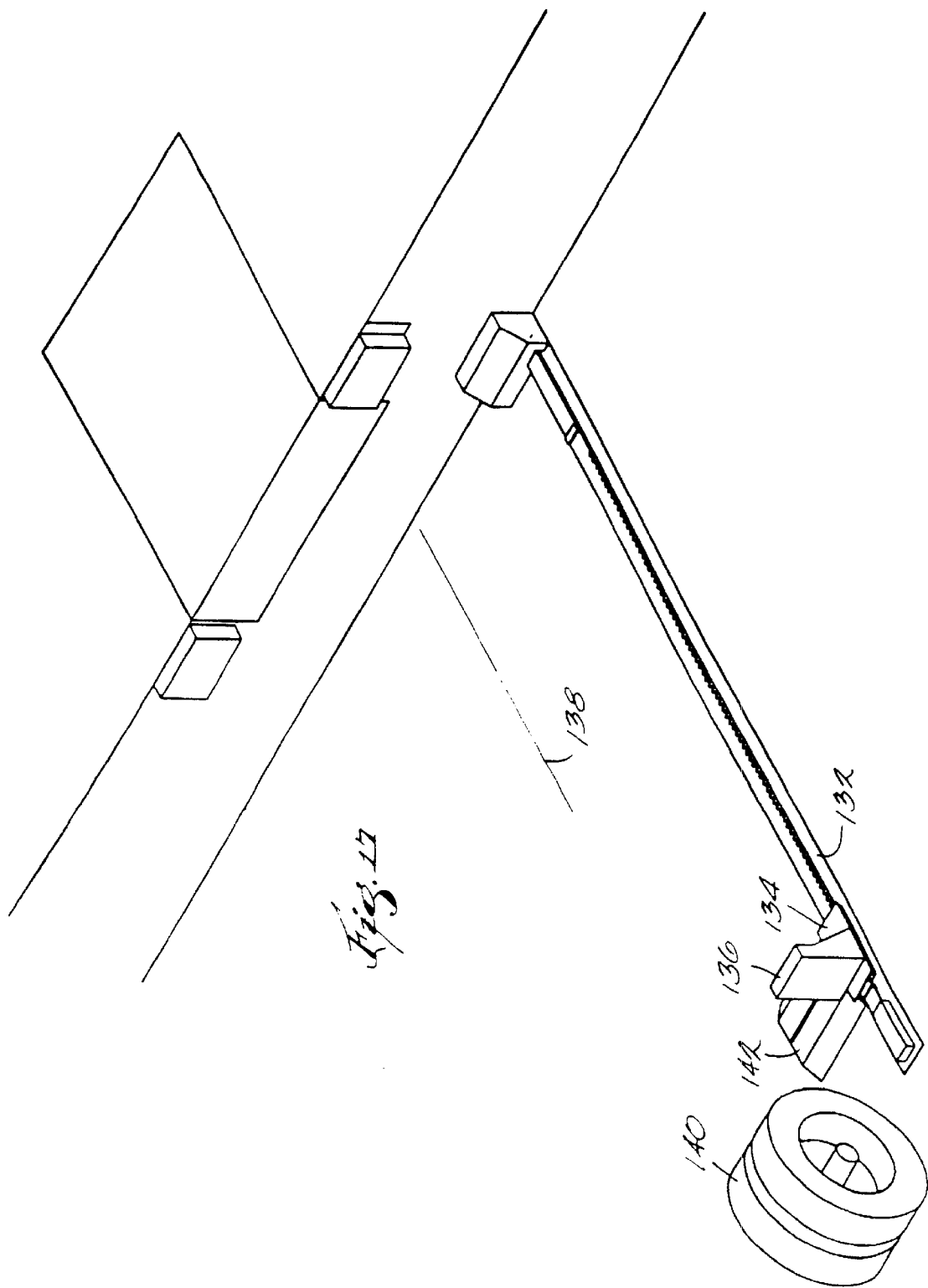

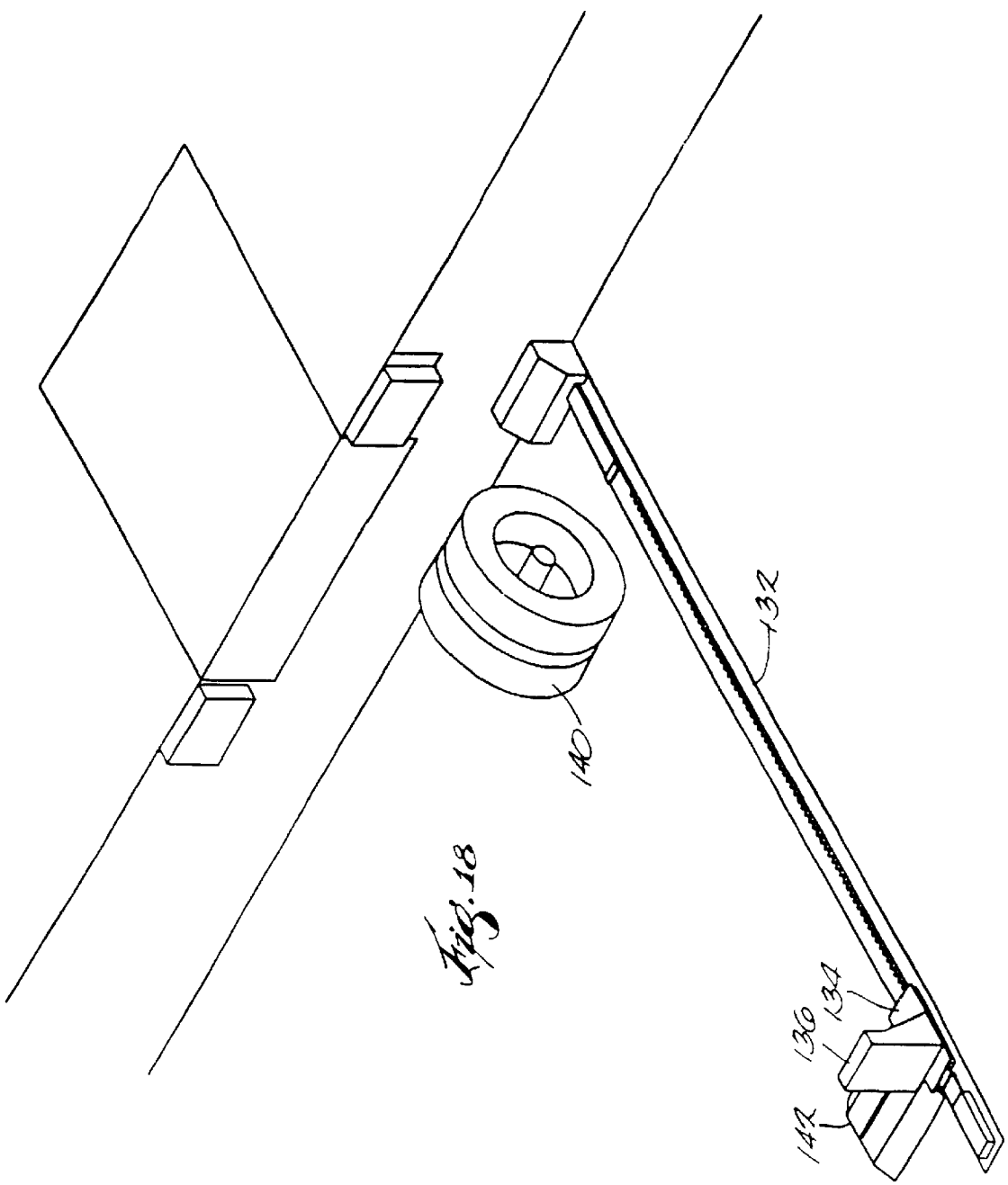

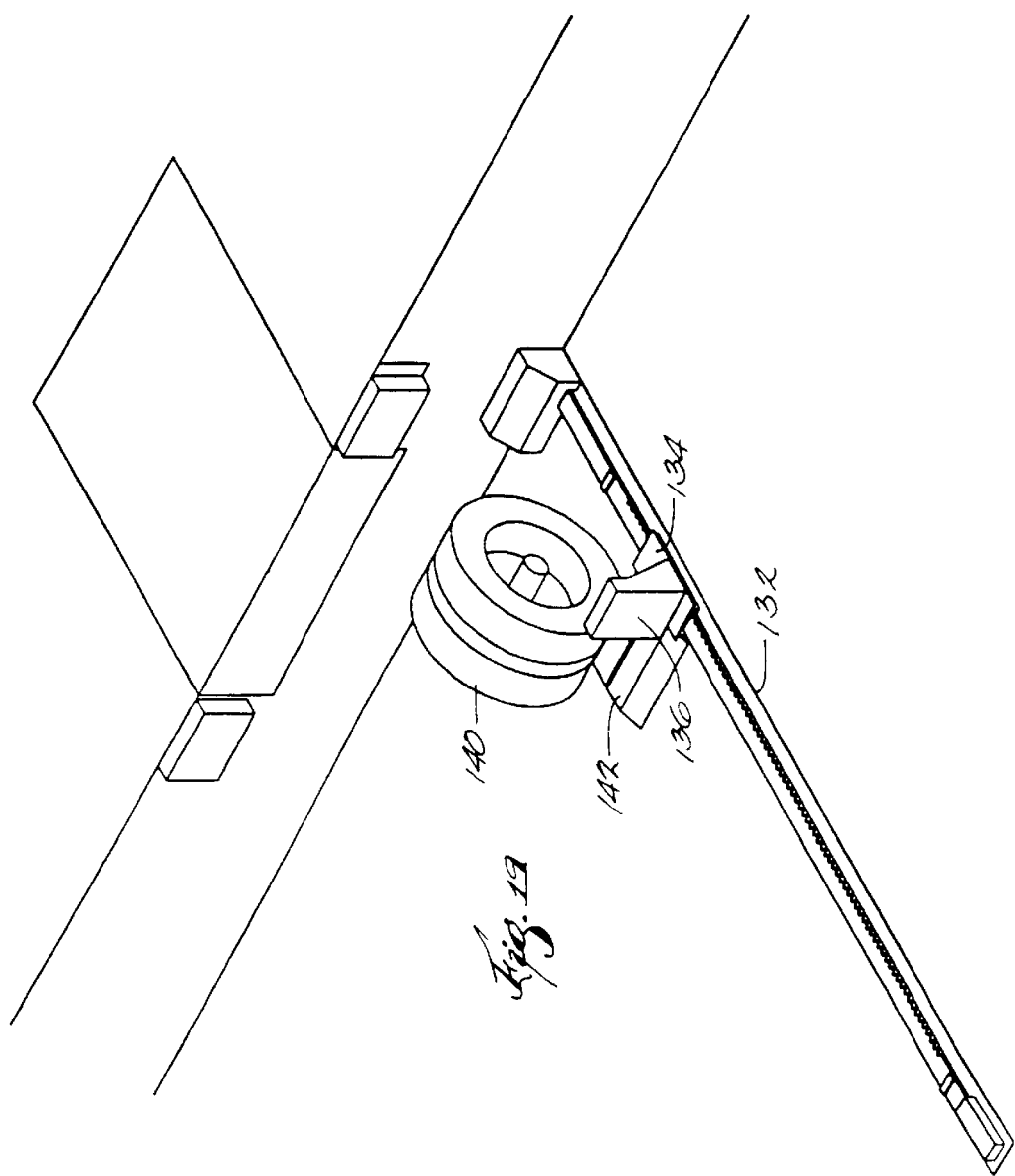

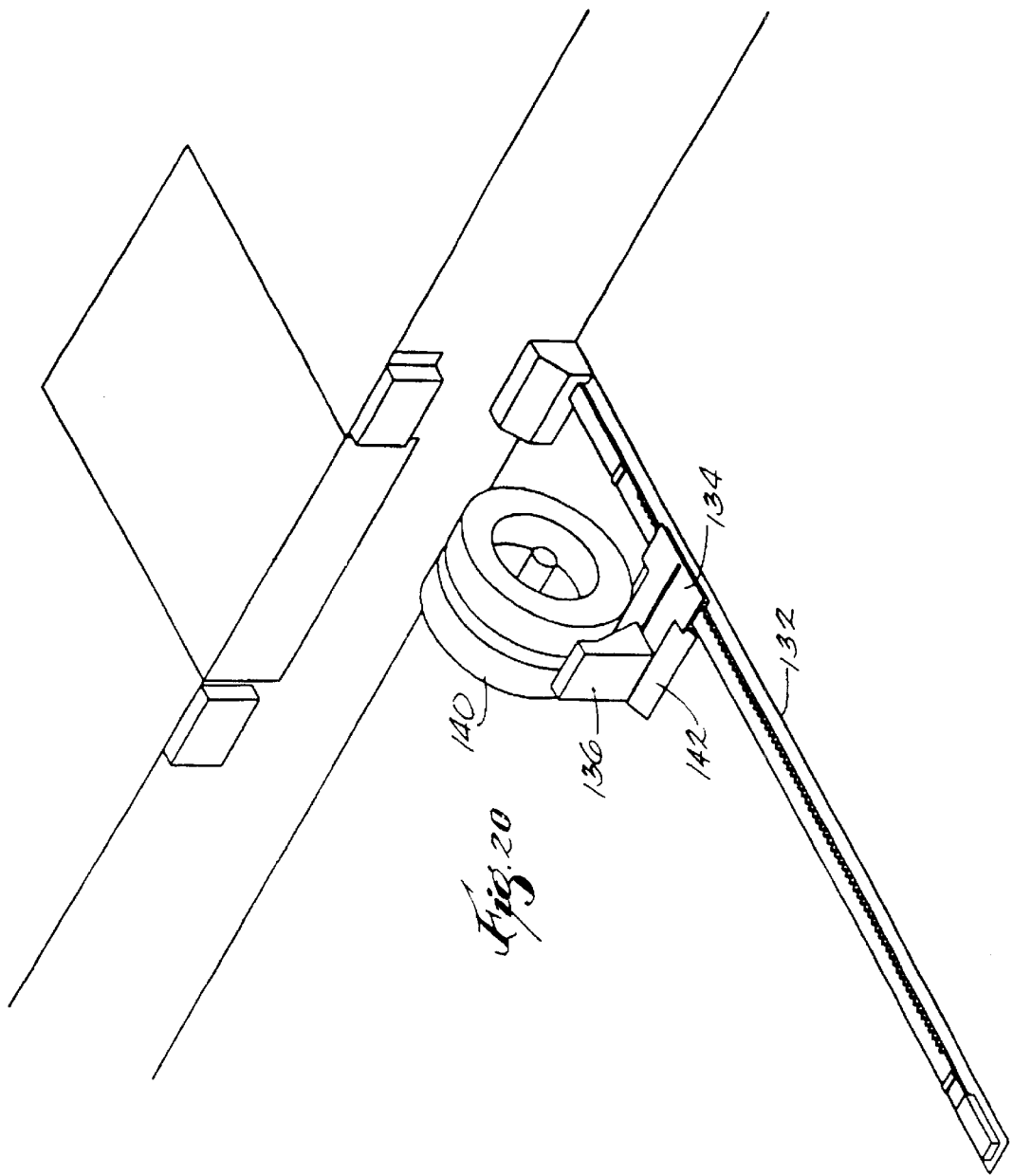

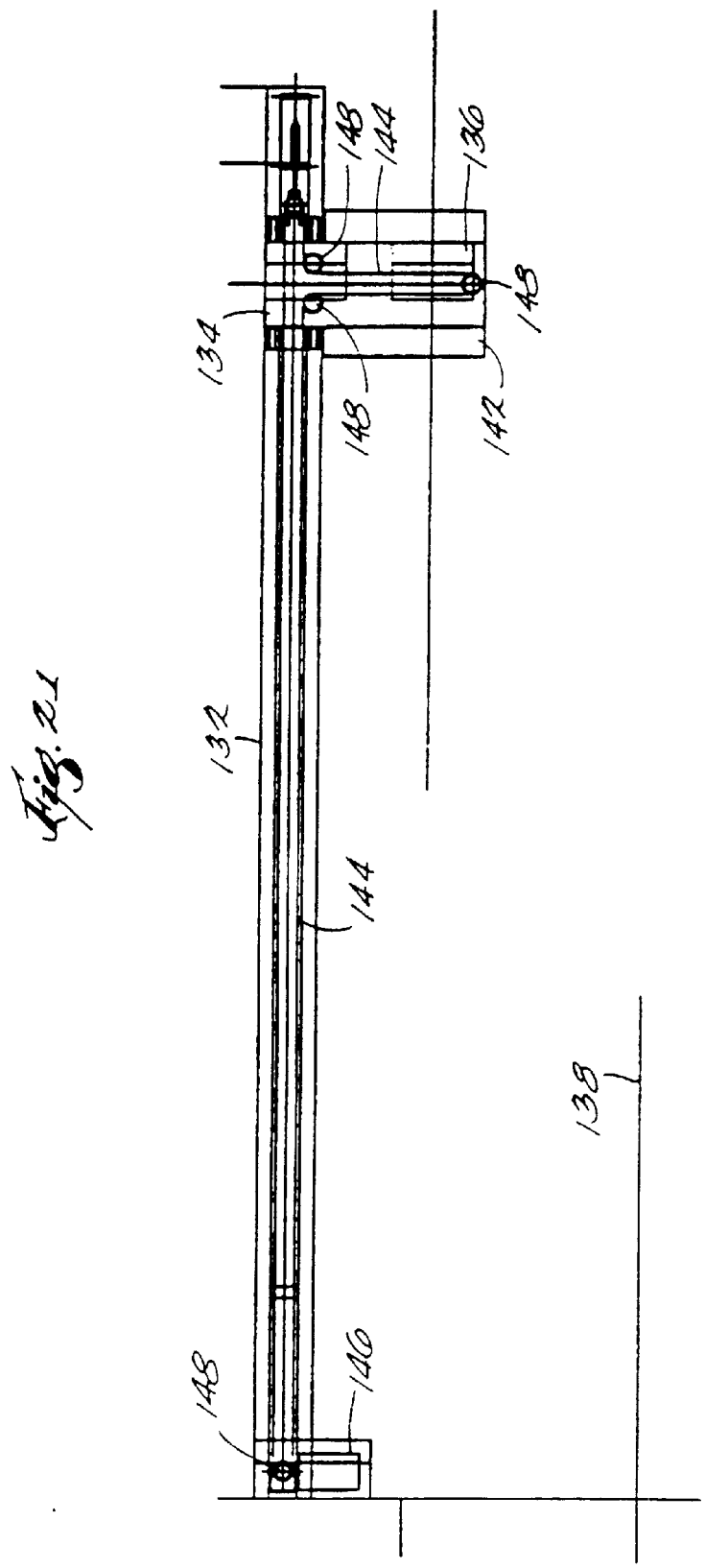

WHEEL CHOCKING DEVICE AND METHOD FOR USING THE SAME

This application claims the benefit of Provisional application Ser. No. 60/020,686, filed Jun. 27, 1996.

FIELD OF THE INVENTION

The present invention generally relates to the field of vehicle restraining devices that prevent movement of a vehicle away from a desired location. More specifically, the present invention relates to powered wheel chocking devices.

BACKGROUND OF THE INVENTION

Powered wheel chocking devices have been developed to allow a vehicle (e.g., a straight truck, a trailer with or without a tractor, etc.) to be secured at a desired location (e.g., a loading dock) so that loading, unloading or other operations can be performed without risk that the vehicle will unexpectedly move away. Such wheel chocking devices typically include a chock that can be selectively moved by a drive mechanism between a chocked position and an unchecked position. These devices are commonly provided with visual and audible signals that indicate when the chock is in the chocked position and when the chock is in a unchecked position.

One type of powered wheel chocking device has been designed by Michel Roux, and is disclosed in European Patent Publication No. 537,075. The Roux device includes a chock that is movable between an unchecked lowered position and chocked raised position. The Roux device is designed to maintain the chock in a lowered position until the chock has been moved longitudinally into contact with the vehicle wheel. After contact with the vehicle wheel, further movement of the drive mechanism causes the chock to pivot to the raised position to secure the vehicle wheel.

A similar device is disclosed in U.S. Pat. No. 5,375,965 to Springer et al. The Springer device also includes a chock that is movable between lowered and raised positions, and the chock is designed to be moved longitudinally into contact with the vehicle wheel while the chock is in the lowered position. After contact with the wheel, the drive mechanism will continue to drive a portion of the chock until the chock moves to the raised position.

SUMMARY OF THE INVENTION

In one aspect, the present invention provides a wheel chocking device having a wheel chock that can be raised from a retracted position to a raised position. In the retracted position, the wheel chock is substantially flat, thereby allowing a truck to be driven over the wheel chock. In the raised position, the wheel chock can be engaged with the wheel of a truck to prevent the truck from driving away from a loading dock.

The wheel chock is preferably movable from a distal position, spaced from the truck wheel, to a proximal position, in contact with a truck wheel. In one embodiment, such movement is provided by an electric motor operatively connected to a worm screw that drives one or more drive nuts. In another embodiment, such movement is provided by pneumatic cylinders that drive cables or chains associated with pneumatic pistons positioned within the cylinders.

The wheel chock can be designed so that it stays in the retracted position while the chock is being moved from the distal position to the proximal position. Upon contacting the truck wheel, the chock can raise to the raised position. Alternatively, the wheel chock can be designed such that, upon movement from the distal position, the wheel chock immediately raises to the raised position. For example, the wheel chock can be raised utilizing a tension spring positioned between the front and rear of the chock assembly. The raised chock can then be moved toward the truck wheel. If the chock should encounter an obstruction in its path hanging down from the under carriage of the truck, the chock will deflect downwardly around the obstruction. After the obstruction is avoided, the chock will again raise to its fully raised position.

In yet another embodiment, as the wheel chock is moved from the distal position, the chock raises from the retracted position to an intermediate position. This intermediate position is lower than the fully raised position and lower than obstructions commonly hanging down from trucks. The chock is then moved toward the vehicle wheel. Upon contact with the vehicle wheel, the chock will raise from the intermediate position to the fully raised position.

Each of the above-described wheel chock assemblies is preferably driven by a drive mechanism at least partially positioned within a cavity formed underneath the surface upon which the truck wheel is positioned. More specifically, the wheel chocking device preferably includes a base plate positioned on the driveway leading to the loading dock, rails extending upwardly from the base plate, and a cover plate positioned over the rails to thereby form one or more channels between the cover plate and the base plate. The drive mechanism (e.g., worm screws, cables or chains) can be positioned within this channel. In use, the truck is first driven onto the cover plate, and then the wheel chock slides over the cover plate until it engages the truck wheel.

The present application also discloses a wheel chocking device wherein the wheel chock can be inserted laterally from the side of the wheel. More specifically, in the resting position, the wheel chock is positioned out of alignment with the plane of the vehicle wheel. After the vehicle is positioned at the loading dock, a drive mechanism is actuated to move the wheel chock longitudinally toward the wheel. When a locator member contacts the wheel, the drive mechanism continues to drive, resulting in the wheel chock moving laterally in front of the wheel.

BRIEF DESCRIPTION OF THE DRAWINGS

FIG. 1 is a perspective view of a first embodiment of the present invention.

FIG. 2 is a side view of the first embodiment shown in FIG. 1 with the chock in a lowered position.

FIG. 3 is a side view of the first embodiment shown in FIG. 1 with the chock in an intermediate position.

FIG. 4 is a side view of the first embodiment shown in FIG. 1 with the chock in a raised position.

FIG. 5 is a perspective view of a second embodiment of the present invention.

FIG. 6 is a side view of the second embodiment shown in FIG. 5 with the chock in a lowered position.

FIG. 7 is a side view of the second embodiment shown in FIG. 5 with the chock in a raised position.

FIG. 8 is a perspective view of a third embodiment of the present invention.

FIG. 9 is a side view of the third embodiment shown in FIG. 8 with the chock in a lowered position.

FIG. 10 is a side view of the third embodiment shown in FIG. 8 with the chock in an intermediate position.

FIG. 11 is a side view of the third embodiment shown in FIG. 8 with the chock in a raised position.

FIG. 12 is a side view of a fourth embodiment of the present invention.

FIG. 13 is a side view of a fifth embodiment of the present invention.

FIG. 14 is a side view of a sixth embodiment of the present invention.

FIG. 15 is a partial top view of the wheel chocking device of FIG. 14.

FIG. 16 is a section view taken along line 3—3 in FIG. 15.

FIG. 17 is a perspective view of a seventh embodiment of the present invention.

FIG. 18 is a perspective view of the seventh embodiment shown in FIG. 17 with a wheel of a vehicle positioned at a loading dock.

FIG. 19 is a perspective view of the seventh embodiment shown in FIG. 17 with the wheel chocking device in an intermediate position.

FIG. 20 is a perspective view of the seventh embodiment shown in FIG. 17 with the wheel chocking device in a chocked position.

FIG. 21 is a top view of the drive mechanism of the seventh embodiment shown in FIG. 17.

DETAILED DESCRIPTION

Figure 22:
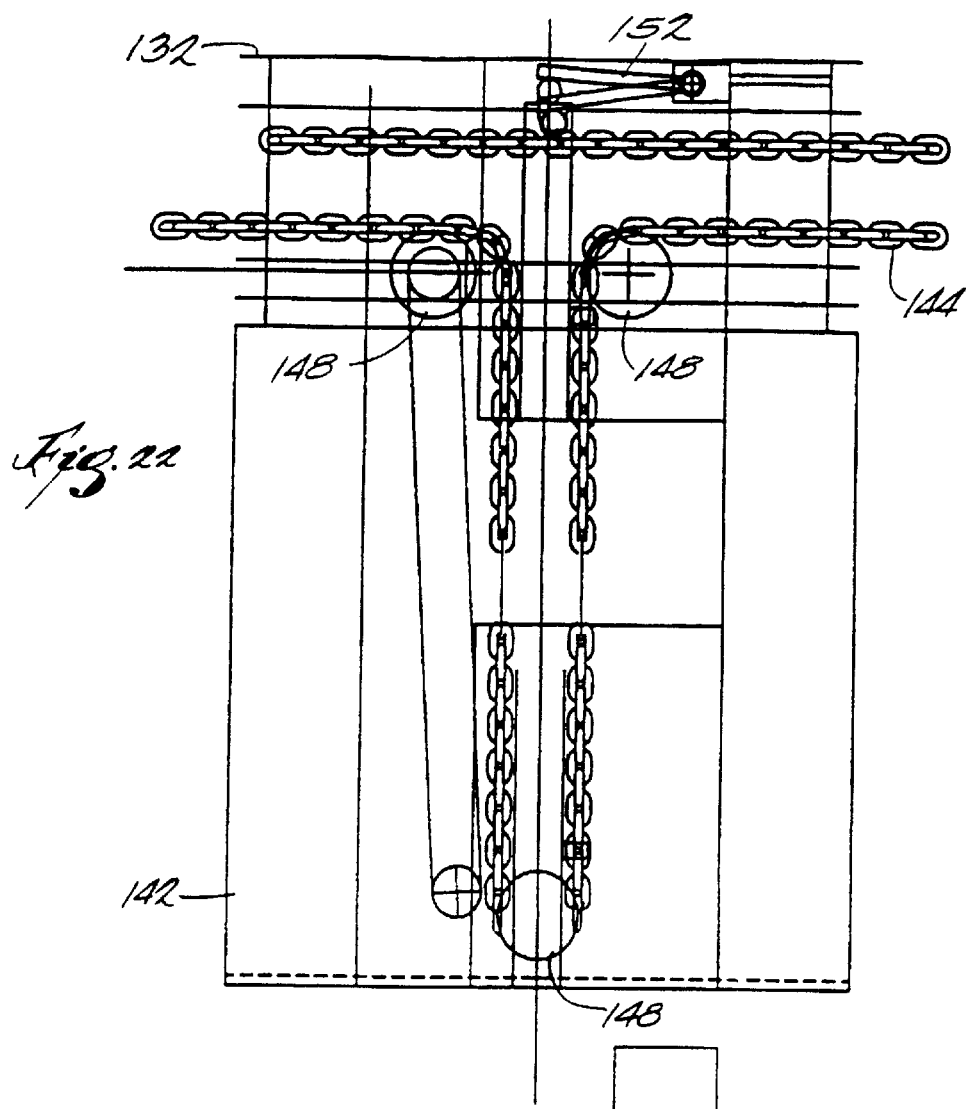
FIG. 22 is an enlarged top view of a portion of the drive mechanism shown in FIG. 17.

FIGS. 1–4 illustrate a wheel chocking device 30 embodying the present invention. Referring to FIG. 1, the illustrated embodiment generally includes a base member 32 and a chock 34 slidable relative to the base member 32. The base member 32 and chock 34 are designed to cooperatively engage and maintain the position of a vehicle wheel 36. The base member 32 includes a ramp portion 38 that facilitates the driving of a vehicle wheel 36 onto the base member 32. The base member 32 further includes a main portion 40 adapted to support the vehicle wheel 36. The main portion 40 houses a drive mechanism (not shown in FIGS. 1–4) and further includes means for guiding the chock, the specifics of which are described below in more detail.

The chock 34 includes a rear slider 42 adapted to slide relative to the base member 32, two front sliders 44 positioned on opposing sides of the base member 32, two front rails 46 pivotally connected to the front sliders 44 and an engaging member 48 pivotally interconnecting the front rails 46 with the rear slider 42. The engaging member 48 includes a first portion 50 pivotally interconnected with the rear slider 42 and a second portion 52 slidably positioned within the first portion 50 and pivotally connected to the front rails 46.

Referring to FIGS. 2—4, the first embodiment of the present invention operates in the following manner. In its resting condition, the front sliders 44 are positioned all the way toward the ramp portion 38 of the base member 32, and the engaging member 48 is resting flat against the main portion 40 of the base member 32 (FIG. 2). In this position, a vehicle wheel 36 can travel up the ramp portion 38 and onto the main portion 40. After the vehicle wheel 36 comes to rest in a desired location, the drive mechanism (not shown) is activated, resulting in the front sliders 44 being moved toward the vehicle wheel 36. Initial movement of the front sliders 44 results in the engaging member 48 pivoting to an intermediate position (FIG. 3). After engagement of the wheel 36 by either the rear slider 42 or the engaging member 48, the front sliders 44 continue movement toward the wheel 36, resulting in the second portion 52 of the engaging member 48 moving to an extended position (FIG. 4). The result is a wheel chock in a fully raised position.

FIGS. 5–7 illustrate a second embodiment of the present invention. Similar to the first embodiment, the second embodiment includes a base member 54 with a ramp portion 56 and a main portion 58, and a chock 60 having a rear slider 62, two front sliders 64, two front rails 66 and an engaging member 68. In the second embodiment, the engaging member 68 is made from a single, non-extendable member. FIGS. 6 and 7 illustrate the second embodiment in lowered and raised positions, respectively.

FIGS. 8–11 illustrate a third embodiment of the present invention. Similar to the first two embodiments, the third embodiment includes a base member 70 having a ramp portion 72 and a main portion 74, and a chock 76 having a rear slider 78 and two front sliders 80. The third embodiment further includes a front link 82 pivotally connected with the front sliders 80 and two intermediate rails 84 pivotally interconnecting the front link 82 with the rear slider 78. FIGS. 9–11 illustrate the third embodiment in lowered, intermediate and fully raised positions, respectively.

It should be appreciated that, with any of the first three embodiments, the wheel chock can be designed to move completely to the fully raised position upon initial activation of the drive mechanism. This can be done, for example, by providing sufficient resistance to the rear slider, thereby forcing the chock to the fully raised position. Furthermore, any of these chocks can be designed to move to an intermediate position, as described above. Providing an intermediate position is advantageous in that the wheel chock can travel underneath obstructions hanging from underneath the vehicle. These chocks can also be designed to stay in a lowered position until the wheel is engaged by the chock.

FIG. 12 illustrates a fourth embodiment of the present invention. Similar to the third embodiment, the fourth embodiment includes a rear slider 86, two front sliders 88, and a front link 90 pivotally connected to the front sliders 88. The fourth embodiment further includes three rear links 92 pivotally connecting the front link 90 with the rear slider 86. The rear links 92 are pivotally connected to the front link 90 at a point 94 spaced from the end of the front link 90. An engaging member 96 is pivotally connected to the end of the front link 90 to provide a surface for engaging the vehicle wheel 98. By virtue of the illustrated arrangement, the chock contacts the vehicle wheel 98 at the substantially highest point on the chock. It is believed that this arrangement increases the restraining capability of the chock.

FIG. 13 illustrates a fifth embodiment of the present invention. The fifth embodiment is similar to the fourth embodiment except that the rear links 100 pivotally interconnect with the front link 102 at the end of the front link 102, and the rear link 100 that is pivotally connected to the front link 102 is angled such that the other rear links 100 are maintained in spaced relation to the vehicle wheel 104.

FIGS. 14–16 illustrate a sixth embodiment of the present invention. Referring to FIG. 14, the sixth embodiment generally includes a rear slider 106, two front sliders 108, a front link 110, and four rear links 112 pivotally interconnecting the front link 110 with the rear slider 106. The use of multiple links allows for the accommodation of wheels having different diameters.

FIGS. 14–16 further illustrate an appropriate drive mechanism for moving the chock toward the vehicle wheel 114 and raising the chock to a raised position. The illustrated drive mechanism includes a pneumatic bag 116 positioned under the front link 110. The bag 116 is designed to initiate the raising of the chock from a lowered position to an intermediate position. This is accomplished by providing the bag 116 with pressurized gas, such as pressurized air, which can typically be found in a manufacturing facility.

Referring to FIGS. 15 and 16, the front slider 108 is driven relative to a base member 118 by a plurality of air cylinders 120 positioned within a compartment defined by the base member 118. In the illustrated embodiment, each side of the base member 118 is provided with two air cylinders 120. A piston 122 is positioned inside each of the air cylinders 120, and a cable 124 is interconnected with each of the pistons 122. Each cable 124 wraps around a corresponding pulley 126 positioned on the ends of the base member 118. The cable 124 wraps around each pulley 126 and returns back to the corresponding piston 122 to thereby form an endless loop. By selectively providing pressurized air to one end of the air cylinders 120, the pistons 122 will be moved away from the pressurized end, thereby providing movement to the cables 124.

Each side of the base member 118 further includes a rod 128 upon which the front sliders 108 are mounted for longitudinal movement relative to the base member 118. The front sliders are secured to the cables 124 such that movement of the cables 124 will result in movement of the front sliders 108. The front sliders 108 each include a slider lock 130 that inhibits movement of the front sliders 108 away from the vehicle wheel 114. In the illustrated embodiment, the slider lock 130 is a bar clamp-type lock that is biased toward the locked position. One end of the cable 124 can be interconnected with the slider lock 130 in such a manner that, when the cable 124 is pulling the front slider 108 away from the vehicle wheel 114, the slider lock 130 will be held in the disengaged position, thereby allowing the front slider 108 to move away from the vehicle wheel 114.

Alternatively, the device can be designed so that the chock raises to a raised position immediately upon moving the chock. For example, this can be accomplished by providing a tension spring between the front and rear sliders. In the stored position, the position of the rear slider can be limited, and the front sliders can be driven away from the rear slider to thereby lower the chock. Preferably, when moving the chock toward the vehicle wheel, the rear slider is driven, thereby facilitating deflection of the chock around any obstructions that may be depending from the vehicle. A more detailed description of this embodiment is set forth in U.S. Provisional application no. 60/020,686, filed Jun. 27, 1996, and PCT Application No. PCT/US97/11411, filed Jun. 2, 1997.

FIGS. 17–23 illustrate a seventh embodiment of the present invention. The illustrated embodiment includes a base member 132, a guide member 134 slidable longitudinally relative to the base member 132, and a chock 136 slidable laterally relative to the guide member 134. In the initial condition, the guide member 134 is positioned all the way to the forward end of the base member 132, and the chock 136 is positioned laterally outward relative to a center line 138 of the loading dock such that the chock 136 is positioned out of a plane defined by the vehicle wheel 140. In this condition, as the vehicle is backed toward the loading dock, the vehicle wheel 140 will travel over a ramp portion 142 of the guide member 134 and toward the loading dock until the vehicle wheel 140 comes to rest at a desired location (FIG. 18). The wheel chocking device is then actuated to move the guide member 134 longitudinally toward the loading dock with the chock 136 remaining in the outward position. When the ramp portion 142 contacts the vehicle wheel 140, the guide member 134 will stop longitudinal movement (FIG. 19). However, the drive mechanism will continue to drive the chock 136, resulting in lateral movement of the chock 136 toward the vehicle wheel 140 and into the plane of the vehicle wheel 140 (FIG. 20). After loading operations are complete, the chock 136 can be moved to the initial condition by reversing the drive mechanism.

The drive mechanism includes a flexible member 144 (e.g., an endless chain) that travels substantially the entire length of the base member 132, and further extends out into the ramp portion 142 of the guide member 134, as illustrated in FIG. 21. The flexible member 144 is driven by an electric motor 146, or any suitable drive means. To achieve the illustrated path, the flexible member travels around a series of pulleys 148 or sprockets.

Figure 23:
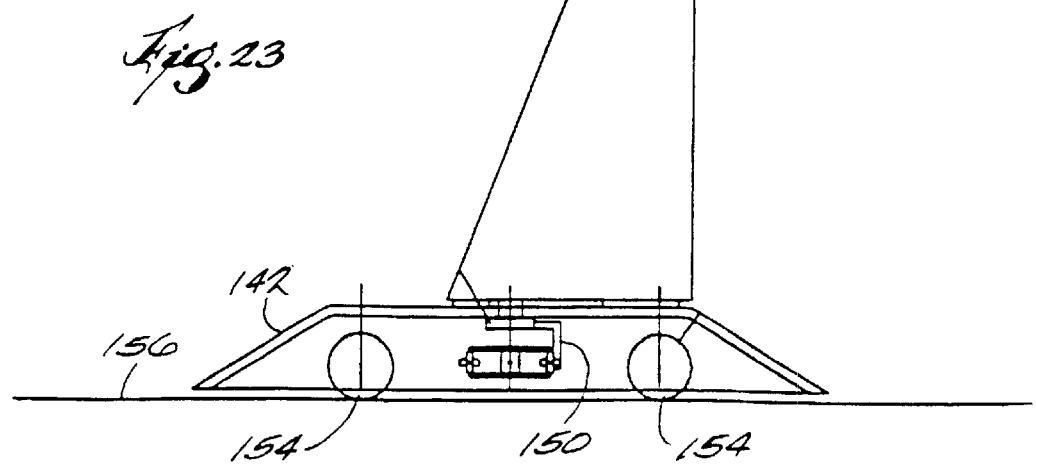
FIG. 23 is a partial side view of the wheel chocking mechanism of FIG. 22.

Referring to FIG. 23, the chock 136 is interconnected with the flexible member 144 by an interconnecting member 150. A sensor 152 is provided to detect the position of the chock 136 (FIG. 22). Wheels 154 can be provided under the guide member 134 to facilitate movement of the guide member 134 over the ground surface 156. The chock 136 can be biased toward the laterally outward position by a spring or other suitable device so that the chock 136 stays in the outward position until the guide member 134 contacts the vehicle wheel 140.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of securing a vehicle at a desired location using a wheel chocking device having a chock movable between a lowered position, an intermediate position, and a raised position, including a first portion and a second portion slidably engaging the first portion, said method comprising the steps of:

driving a wheel of the vehicle over the chock;
   positioning the vehicle at the desired location with the chock in the lowered position;
   raising the chock to the intermediate position and sliding the second portion relative to the first portion;
   moving the chock in the intermediate position toward the wheel of the vehicle;
   contacting the wheel with the chock in the intermediate position; and
   further raising the chock from the intermediate position to the raised position after said contacting step.

2. A wheel chocking device adapted to secure a vehicle in a desired location on a driveway, the vehicle having a wheel, the wheel chocking device comprising:

a base member adapted to be positioned on the driveway; and a chock coupled to the base member for movement relative to the base member, the chock being stored in a lowered positioned, moveable toward the wheel in an intermediate position, and movable to a raised position after the chock contacts the wheel in the intermediate position;

wherein the chock includes a rear portion coupled to the base member for movement relative to the base member; and the chock includes an engaging portion pivotally coupled to the rear portion;

wherein the engaging portion includes a first portion pivotally coupled to the rear portion and a second coupled to the first portion for movement relative to the first portion.

3. The wheel chocking device of claim 2, wherein the second portion is positioned within the first portion.

4. The wheel chocking device of claim 2, wherein the chock includes first and second front portions coupled to the base member for movement relative to the base member and front rails pivotally coupling the second portion to the front portions.

* * * * *